United States Patent
Stepp

(10) Patent No.: US 8,512,666 B2
(45) Date of Patent: Aug. 20, 2013

(54) PROCESS FOR THE PREPARATION OF DODECAHALONEOPENTASILANES

(75) Inventor: Michael Stepp, Ueberackem (AT)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/379,458

(22) PCT Filed: Jun. 16, 2010

(86) PCT No.: PCT/EP2010/058430
§ 371 (c)(1), (2), (4) Date: Dec. 20, 2011

(87) PCT Pub. No.: WO2010/149547
PCT Pub. Date: Dec. 29, 2010

(65) Prior Publication Data
US 2012/0100057 A1    Apr. 26, 2012

(30) Foreign Application Priority Data
Jun. 25, 2009 (DE) .................. 10 2009 027 194

(51) Int. Cl.
*C01B 33/107* (2006.01)
(52) U.S. Cl.
USPC .......................................... 423/342; 423/341
(58) Field of Classification Search
USPC ................................................ 423/341, 342
See application file for complete search history.

(56) References Cited

U.S. PATENT DOCUMENTS

| 4,281,145 | A | * | 7/1981 | Mitchell | 556/440 |
| 4,639,361 | A | * | 1/1987 | Aono et al. | 423/347 |
| 2010/0176338 | A1 | * | 7/2010 | Cannady et al. | 252/182.3 |
| 2011/0171098 | A1 | | 7/2011 | Knies et al. | |
| 2011/0284796 | A1 | * | 11/2011 | Auner et al. | 252/182.32 |

FOREIGN PATENT DOCUMENTS

WO  2008051328 A1   5/2008
WO  2010043551 A1   4/2010

OTHER PUBLICATIONS

Hoefler et al., "Preparation and Properties of Some Highly Chlorinated Oligosilanes", Z. anorg. allg. Chem, vol. 428, pp. 75-82 (1977).
Kaczmarczyk et al., "The Preparation and Some Properties of a New Pentasilicon Dodecachloride, Si5Cl12(1)", J. Inorg. Nucl. Chem., vol. 26, pp. 421-425 (1964).
Urry, "Systematic Synthesis in the Polysilane Series", ACC. Chem. Res., vol. 3, No. 9, pp. 306-312 (1970).
International Search Report for PCT/EP2010/058430 dated Sep. 3, 2010.

* cited by examiner

*Primary Examiner* — Ngoc-Yen Nguyen
(74) *Attorney, Agent, or Firm* — Caesar, Rivise, Bernstein, Cohen & Pokotilow, Ltd.

(57) ABSTRACT

The invention relates to a method for producing neopentasilanes of the general formula (1) $Si(SiR_3)_4$ (1), wherein silicon compounds of the general formula (2) $R_3Si-(SiR_2-)_xSiR_3$ (2), where R is selected from Cl, Br, and I, and x is a non-negative whole number up to 5, are converted in the presence of catalytically active compounds (K), wherein the separating of the tetrahalogen silane formed thereby takes place by distilling out in the presence of a compound (L) that is liquid at room temperature having a higher boiling point than the released tetrahalogen silane.

14 Claims, No Drawings

PROCESS FOR THE PREPARATION OF DODECAHALONEOPENTASILANES

BACKGROUND OF THE INVENTION

The invention relates to a process for the preparation of dodecahaloneopentasilanes from perhalopolysilanes in the presence of catalysts and a high-boiling solvent.

The silicon-hydrogen compounds obtainable from the dodecahaloneopentasilanes (neopentasilanes=tetrakis(silyl) silanes) are used for the deposition of Si—C in CVD processes.

The preparation of dodecahaloneopentasilanes is described, for example, in WO 20080513284 and J. Inorg. Nucl. Chem., 1964, Vol. 26, 421-425.

In WO 20080513284, hexahalodisilane is reacted with tertiary amines as catalysts to give mixtures containing tetrakis (trihalosilyl)silane. For working-up, the reaction mixture is evaporated to dryness in vacuo so that sparingly volatile impurities (e.g. perhalopolysilanes) cannot be separated off at all or can be separated off only incompletely. Purification is effected only after exchange of the chlorine atoms for hydrogen by distillation of the target product neopentasilane. Since alkylaluminium hydrides are used for this subsequent reaction, halogen-containing by-products account for an unnecessarily high consumption of these expensive starting compounds and are therefore an economic disadvantage.

J. Inorg. Nucl. Chem., 1964, Vol. 26, 421-425, discloses the preparation of dodecachloroneopentasilane from hexachlorodisilane or octachlorotrisilane with trimethylamine.

Furthermore, it is stated there that dodecachloroneopentasilane forms adducts with the tetrachlorosilane formed as a by-product. Only by expensive and tedious drying of the solid in vacuo is it possible to remove the tetrahalosilane, bound in the crystal, and other volatile impurities, such as, for example, hexachlorodisilane. The process is therefore unsuitable for the preparation of the pure perhalopolysilanes on an industrial scale.

An object was the development of a process which no longer has the disadvantages of the prior art.

DESCRIPTION OF THE INVENTION

The invention relates to a process for the preparation of neopentasilanes of the general formula (1)

$$Si(SiR_3)_4 \quad (1),$$

in which silicon compounds of the general formula (2)

$$R_3Si-(SiR_2-)_xSiR_3 \quad (2),$$

in which
R is selected from Cl, Br and I and
x denotes a non-negative integer up to 5,
are reacted in the presence of catalytically active compounds (K), the tetrahalosilane formed being separated off by distillation in the presence of a compound (L) which is liquid at room temperature and has a higher boiling point than the tetrahalosilane liberated.

The tetrahalosilane can be separated off in a simple and very effective manner by the process according to the invention. Thus, pure neopentasilanes of the general formula (1) can be obtained.

All compounds which are unreactive under the reaction and distillation conditions with Si—Si and Si-halogen compounds, such as hydrocarbons, e.g. alkanes (n-hexane, n-heptane, n-octane, cyclohexane, cycloheptane, paraffins, e.g. Hydroseal G400H, decalin), alkenes (e.g. cyclohexene, 1-heptene, 1-octene, cyclooctene), aromatics (e.g. benzene, toluene, o-xylene, m-xylene, p-xylene, bromobenzene, chlorobenzene, fluorobenzene), ethers (e.g. di-n-butyl ether, di-n-hexyl ether, diphenyl ether, phenyl methyl ether, 1,4-dioxane, 3,4-dihydro-2H-pyran, tetrahydropyran); siloxanes, in particular linear dimethylpolysiloxanes having trimethylsilyl terminal groups with preferably 0 to 6 dimethylsiloxane units, or cyclic dimethylpolysiloxanes having preferably 4 to 7 dimethylsiloxane units, for example hexamethyldisiloxane, octamethyltrisiloxane, octamethylcyclotetrasiloxane, decamethylcyclopentasiloxane or mixtures of said substances, are suitable as compound (L) which is liquid at room temperature, referred to below as high boilers (L). Preferred substances are those in which the dodecahaloneopentasilanes are poorly soluble, in particular hydrocarbons and siloxane. Owing to their commercial availability and the low reactivity, hydrocarbons, such as toluene, high-boiling paraffins and decalin, are particularly preferred. High boilers (L) whose boiling point at 1023 hPa is at least 10° C., particularly preferably at least 15° C., above the boiling point of the respective tetrahalosilane are preferably used.

Suitable catalytically active compounds (K) are all compounds which are suitable for accelerating the rearrangement reaction of linear perhalopolysilanes to give perhaloneopentasilanes. They are used in the concentrations stated in the documents mentioned. In order to ensure that the catalytically active compounds (K) used are separated off as completely as possible, catalytically active compounds (K) whose boiling points at 1023 hPa are at least 10° C., in particular at least 20° C., below the boiling point of the high boiler (L) are preferably used in the process according to the invention.

Preferred catalytically active compounds (K) are ether compounds (E) and tertiary amine compounds (N).

Ether compounds (E) are chemicals which are easily obtainable and easy to separate off.

Preferred ether compounds (E) are cyclic organic ether compounds which preferably have at least 5 ring atoms and preferably not more than 30 ring atoms, such as 1,3-dioxolane, tetrahydrofuran (THF), tetrahydropyran, 1,4-dioxane, [12]crown-4, [15]crown-5. The cyclic ether compounds (E) may have hydrocarbon substituents, in particular alkyl radicals having 1 to 6 carbon atoms, preferably methyl and ethyl. Examples of substituted cyclic ether compounds (E) are 4-methyl-1,3-dioxolane, 3-methyltetrahydrofuran, 2,2-dimethyl-1,4-dioxane.

Likewise preferred are linear or branched organic ether compounds (E), such as mono- and polyethers. Preferred monoethers are ethers having a boiling point of at least 60° C. at 1023 hPa, for example di-n-propyl ether.

Polyalkylene glycols, such as polyethylene glycol and polypropylene glycol, which preferably have no free OH groups, i.e. are terminated with alkyl or aryl radicals, for example polyethylene glycol dimethyl ether, can also be used as polyethers. The average molar masses Mn of the polyalkylene glycols are preferably at least 150, in particular at least 500 and preferably not more than 10 000, in particular not more than 5000.

Preferred tertiary amine compounds (N) are monoamines or linear, branched or cyclic polyamines.

The monoamines of the general formula (3)

$$N(R^1)_3 \quad (3),$$

in which
$R^1$ denotes a hydrocarbon radical having 1 to 20 carbon atoms,
are preferred.

The hydrocarbon radicals $R^1$ may be saturated or unsaturated, branched or straight-chain, substituted or unsubstituted. In the general formula (3), radicals $R^1$ of different types or of the same type can be present.

The hydrocarbon radicals $R^1$ may be an alkyl radical, such as the methyl, ethyl, n-propyl, isopropyl, 1-n-butyl, 2-n-butyl, isobutyl, tert-butyl, n-pentyl, isopentyl, neopentyl or tert-pentyl radical; hexyl radical, such as the n-hexyl radical; heptyl radical, such as the n-heptyl radical; octyl radical, such as the n-octyl radical and isooctyl radicals, such as the 2,2,4-trimethylpentyl radical; nonyl radical, such as the n-nonyl radical; decyl radical, such as the n-decyl radical; dodecyl radical, such as the n-dodecyl radical; octadecyl radical, such as the n-octadecyl radical; cycloalkyl radical, such as the cyclopentyl, cyclohexyl and cycloheptyl radical and methyl-cyclohexyl radicals; alkenyl radical, such as the vinyl, 1-propenyl and 2-propenyl radical; aryl radical, such as the phenyl, naphthyl, anthryl and phenanthryl radical; alkaryl radical, such as o-, m-, p-tolyl radicals; xylyl radical and ethylphenyl radical; and aralkyl radical, such as the benzyl radical and the alpha- and the beta-phenylethyl radical. The hydrocarbon radical $R^1$ preferably has 1-6, in particular 1-3, carbon atoms. $R^1$ is preferably the methyl, ethyl, isopropyl and n-propyl, isobutyl and n-butyl, pentyl, hexyl, heptyl, octyl, nonyl, decyl, phenyl, benzyl or allyl radical.

Preferred linear tertiary polyamines (N) are polyamines (N) containing ethylene- or propylenediamine units and having N-alkyl radicals, or mixtures thereof. Preferably the polyamines (N) contain 1 to 20, in particular 1 to 10, ethylene- or propylenediamine units.

Particularly preferred tertiary amine compounds (N) are trimethylamine and triethylamine.

Preferably at least 0.1, particularly preferably at least 0.5 and in particular at least 2 parts by weight of catalytically active compounds (K) and preferably not more than 50, particularly preferably not more than 20 and in particular not more than 10 parts by weight of catalytically active compounds (K) are used per 100 parts by weight of silicon compounds of the general formula (2).

The neopentasilane of the general formula (1) may have the same or different meanings of R in a molecule. Preferably, all R have the same meanings. Particularly preferably, R represents Cl.

x preferably denotes the values 0 or 1.

The conversion of the silicon compound of the general formula (2) into the target product of the general formula (1) is started by addition of the catalyst. For accelerating the reaction, the by-product tetrahalosilane formed in the reaction is distilled off from the beginning in the process according to the invention. This can be effected in vacuo, at ambient pressure or at superatmospheric pressure. Preferably, the reaction is effected under ambient pressure. The reaction is preferably effected at at least −10° C., particularly preferably at at least 50° C. and in particular at at least 100° C., and preferably at not more than 300° C., in particular at not more than 250° C. The reaction is preferably carried out for at least 1 hour, particularly preferably at least 3 hours and in particular at least 10 hours and preferably not more than 10 days.

To achieve as high a space/time yield as possible, the high boiler (L) is preferably added to the bottom part of the distillation only after the end of the reaction, i.e. when the main amount of the tetrahalosilane formed has been distilled off and accordingly sufficient space is available in the distillation still. Distillation is then preferably continued up to the boiling point of the high boiler (L). Owing to the higher boiling point of the high boiler (L), the free and the bound tetrahalosilane is removed by entrainment. The bottom part of the distillation is then allowed to cool, the tetrahalosilane-free target product (1) being precipitated and being capable of being isolated by filtration, sedimentation or centrifuging, preferably as pure solid, or of being further processed directly in suspension.

In another, less preferred variant of the process according to the invention, the tetrahalosilane formed is distilled off not during the reaction itself but only after the end of the reaction, and high boiler (L) is then added and remaining (free and bound) tetrahalosilane is then distilled off.

By redissolving the solid in the high boiler (L) used or in another high boiler (L) or another solvent and then separating off insoluble constituents by filtration, sedimentation or centrifuging, the product can be further purified. It can then be further processed as a solution or recrystallized again by evaporating down or cooling and isolated as solid.

The added amount of high boiler (L) depends primarily on the solubility of the target product, i.e. as little high boiler (L) as possible is added. Preferably, the amount of high boiler is such that the target product is dissolved as completely as possible at elevated temperature and substantially separates out on cooling.

The preferred amount of high boiler (L) is at least 2, in particular at least 5, % by weight and preferably not more than 20, in particular not more than 50, % by weight, based in each case on the amount of silicon compound of the general formula (2) which is used. The optimal amount can be easily determined in the specific case by adding, at the boiling point, exactly the amount of high boiler (L) at which the target product just completely dissolves.

Preferably, a cooling process, preferably to a temperature of at least −15° C., in particular at least 0° C., and preferably not more than 60° C., particularly preferably not more than 40° C., in particular to room temperature of 18 to 25° C., is effected after the reaction. During this procedure, the target product of the general formula (1) crystallizes out in pure form and is isolated by filtration, sedimentation or centrifuging. The mother liquor can be added to the next batch; however, it is also possible by cooling and/or evaporating down—i.e. distilling off volatile fractions, in particular high boilers (L)—to precipitate dissolved target product of the general formula (1) and isolate it as described above. The entire process or individual process steps can be carried out independently of one another in the presence or absence of inert gas, such as nitrogen, helium or argon; however, they can also be carried out in air, provided that the moisture content is preferably not more than 10 ppbw. Preferably, all process steps are carried out in the presence of nitrogen for cost reasons.

All above symbols of the above formulae have their meanings in each case independently of one another. In all formulae, the silicon atom is tetravalent.

Unless stated otherwise, the example below is carried out at a pressure of the ambient atmosphere, i.e. at about 1000 hPa, and at room temperature, i.e. at about 23° C., and at a relative humidity of about 50%.

Example 1

2254 g of hexachlorodisilane (Wacker Chemie AG, Germany) and 145 g of tetrahydrofuran (Merck KGaA, Germany) were initially introduced into a 2 l flask which was blanketed with nitrogen and was provided with a thermometer, 35 cm packed column and magnetic stirrer. The mixture was heated to the boil. The resulting top temperature was 56° C. By further heating the reaction mixture to not more than 143° C., it was possible to maintain a continuous distillate stream. Within 5 h, 1014.3 g of distillate were taken off, which contained 89% of tetrachlorosilane and 11% of THF according to GC. A white solid was precipitated in the bottom of the distillation. After addition of 216 g of toluene, the reaction mixture was heated again to the boil. Within 90 minutes, altogether 102.7 g of distillate were taken off up to a top temperature of 107° C. According to GC, the distillate had the following composition: 66% of tetrachlorosilane, 29% of toluene, 4% of hexachlorodisilane, 0.8% of THF. After cooling to room temperature, the while suspension was filtered over a glass frit, washed with toluene and dried by passing through nitrogen and applying a vacuum from a water jet pump. 506.5 g of a colourless crystalline solid were isolated, the $^1$H— and $^{29}$Si—NMR of which showed that, apart from the target product dodecachloroneopentasilane, only traces of tetrachlorosilane, toluene and hexachlorodisilane were present.

The invention claimed is:

1. Process for the preparation of neopentasilanes of the general formula (1)

$$\text{Si(SiR}_3)_4 \qquad (1),$$

said process comprising:
(a) a reacting step in which silicon compounds of the general formula (2)

$$R_3\text{Si}-(\text{SiR}_2-)_x\text{SiR}_3 \qquad (2),$$

where
R is a member selected from the group consisting of Cl, Br and I, and
x denotes a non-negative integer up to 5,
are reacted in the presence of catalytically active compounds,
(b) a first distilling step in which a tetrahalosilane which is formed in the reacting step is separated off from a beginning of the reacting step by distillation in a still,
(c) an addition step in which a high boiler compound is added to a bottom of the still after an end of the reacting step, wherein the high boiler compound is liquid at room temperature and has a higher boiling point than the tetrahalosilane liberated by the first distilling step,
(d) a second distilling step in which an additional amount of the tetrahalosilane is separated off by distillation in a presence of the high boiler compound, and
(e) a cooling step in which the bottom part of the still is allowed to cool such that tetrahalosilane-free neopentasilane precipitate forms.

2. Process according to claim 1, in which the high boiler compound is a member selected from the group consisting of hydrocarbons, ethers, siloxanes and mixtures thereof.

3. Process according to claim 1, in which a boiling point at 1023 hPa of the high boiler compound is at least 10° C. above a boiling point of the respective tetrahalosilane.

4. Process according to claim 1, in which 2 to 50% by weight is employed of the high boiler compound, based on an amount of silicon compounds of the general formula (2) which is used.

5. Process according to claim 1, in which the catalytically active compounds are selected from the group consisting of ether compounds and tertiary amine compounds.

6. Process according to claim 5, in which the catalytically active compounds are tetrahydrofuran, trimethylamine or triethylamine.

7. Process according to claim 1, in which, based on 100 parts by weight of silicon compounds of the general formula (2), 0.1 to 50 parts by weight of catalytically active compounds are used.

8. Process according to claim 1, in which x denotes the values 0 or 1.

9. Process according to claim 2, in which a boiling point at 1023 hPa of the high boiler compound is at least 10° C. above a boiling point of the respective tetrahalosilane.

10. Process according to claim 9, in which 2 to 50% by weight is employed of the high boiler compound, based on an amount of silicon compounds of the general formula (2) which is used.

11. Process according to claim 10, in which the catalytically active compounds are selected from the group consisting of ether compounds and tertiary amine compounds.

12. Process according to claim 11, in which the catalytically active compounds are tetrahydrofuran, trimethylamine or triethylamine.

13. Process according to claim 12, in which, based on 100 parts by weight of silicon compounds of the general formula (2), 0.1 to 50 parts by weight of catalytically active compounds are used.

14. Process according to claim 13, in which x denotes the values 0 or 1.

* * * * *